(12) United States Patent
Takahashi et al.

(10) Patent No.: US 7,804,224 B2
(45) Date of Patent: Sep. 28, 2010

(54) PIEZOELECTRIC MOTOR AND PIEZOELECTRIC MOTOR SYSTEM

(75) Inventors: Hiroshi Takahashi, Yokohama (JP); Osamu Nishimura, Kawasaki (JP); Toshikatsu Akiba, Kisarazu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 12/039,319

(22) Filed: Feb. 28, 2008

(65) Prior Publication Data
US 2008/0238249 A1 Oct. 2, 2008

(30) Foreign Application Priority Data
Mar. 27, 2007 (JP) .................. P2007-081983

(51) Int. Cl.
*H02N 2/10* (2006.01)
(52) U.S. Cl. .............. 310/323.02; 310/317; 310/323.09
(58) Field of Classification Search ............ 310/323.09, 310/323, 317
See application file for complete search history.

(56) References Cited

U.S. PATENT DOCUMENTS

| 6,803,736 B1 * | 10/2004 | Hommel et al. ............. 318/567 |
| 2001/0020809 A1 * | 9/2001 | Matsuo et al. .............. 310/328 |
| 2002/0057040 A1 * | 5/2002 | Shibatani ............... 310/323.16 |
| 2005/0067922 A1 * | 3/2005 | Sasaki et al. ........... 310/323.09 |
| 2006/0039079 A1 * | 2/2006 | Kobayashi et al. ....... 360/78.05 |
| 2006/0109372 A1 * | 5/2006 | Noji ........................ 348/360 |

FOREIGN PATENT DOCUMENTS

| JP | 63-56176 | 3/1988 |
| JP | 3-86087 | 4/1991 |
| JP | 6-5992 | 1/1994 |
| JP | 8-88987 | 4/1996 |
| JP | 3065427 | 5/2000 |
| JP | 2000-165738 | 6/2000 |
| JP | 2001-211676 | 8/2001 |
| JP | 2002-90282 | 3/2002 |
| JP | 2004-120840 | 4/2004 |
| JP | 2006-246660 | 9/2006 |

OTHER PUBLICATIONS

U.S. Appl. No. 12/051,099, filed Mar. 19, 2008, Takahashi.

* cited by examiner

*Primary Examiner*—Walter Benson
*Assistant Examiner*—Bryan P Gordon
(74) *Attorney, Agent, or Firm*—Oblon, Spivak, McClelland, Maier & Neustadt, L.L.P.

(57) ABSTRACT

A piezoelectric motor includes: a plurality of piezoelectric units, respectively in contact with a driven target, disposed separately from each other, and configured to drive the driven target; and a magnet configured to apply a preload force to each of the plurality of piezoelectric units by magnetically attracting the driven target in the absence of direct contact with the driven target.

15 Claims, 5 Drawing Sheets

PIEZOELECTRIC MOTOR AND PIEZOELECTRIC MOTOR SYSTEM

CROSS REFERENCE TO RELATED APPLICATIONS AND INCORPORATED BY REFERENCE

The application is based upon and claims the benefit of priority from the prior Japanese Patent Applications No. P2007-081983, filed on Mar. 27, 2007; the entire contents of which are incorporated herein by reference.

BACKGROUND OF THE INVENTION

1. Field of the Invention

The present invention relates to a piezoelectric motor and a piezoelectric motor system driving a driven target using a piezoelectric unit.

2. Description of the Related Art

Conventionally, in the field of multi-degree-of-freedom rotary-drive control systems, typified by the orientation control of a surveillance camera, a joint of a robot, and the like, a drive mechanism or motor system is in wide use with a structure in which single-axis drive motors are stacked in series. Moreover, from the viewpoint of achieving miniaturization and higher precision, sometimes a multi-degree-of-freedom drive mechanism or multi-degree-of-freedom motor system is used that includes a support system mainly composed of a gimbal mechanism and a joint mechanism and a drive system mainly composed of a separately provided electromagnetic motor and the like. However, the conventional drive mechanism or motor system with the basic structure mainly composed of the gimbal mechanism and joint mechanism has not always been satisfactory because the structure is complicated and there is a limit to miniaturization. In light of such circumstances, studies and development of spherical motors using piezoelectric elements have been attracting attentions in recent years. Piezoelectric motors in particular, which drive a sphere (as a driven target) by frictional force using a piezoelectric unit, are regarded as promising for next-generation spherical motors that have a small size and high precision.

For a piezoelectric motor using a piezoelectric element, a device for changing the angle of a ball joint is known. In this device for changing the angle of a ball joint, three oscillators (piezoelectric units) are disposed in a predetermined arrangement inside a ball housing member that houses a ball member of the ball joint, and respective tip portions of these three oscillators abut on the ball. To maintain of the abutment, the ball is configured to be energized towards the oscillators by a plurality of spring members similarly disposed in a predetermined arrangement inside the ball housing member. In this state, each of the joined portions of these oscillators is rotated in a desired, predetermined direction, and thus the ball member of the ball joint is rotated in a desired direction. Thereby, the angle of the ball joint is changed in a predetermined direction. Each oscillator (piezoelectric unit) is comprised of three oscillation elements (piezoelectric elements) that are integrated into a single body with their tip portions joined to each other, and the oscillation elements (piezoelectric elements) are disposed in positions corresponding to three edges of a regular triangular pyramid, with their center at the tip of the pyramid.

As another conventional example of a piezoelectric motor using a piezoelectric unit, an image pickup apparatus is known in which an image pickup unit is substantially spherical, with its circumferential surface formed to be convexly spherical, except for an image pickup optical system portion. Additionally, an image pickup optical system and an image pickup device, such as a CCD, are provided inside the image pickup unit. A casing (spherical) of the image pickup unit is formed of for example, magnetic material, and the convexly spherical surface portion thereof is attracted to a holding member in the form of an annular magnet. The holding member is fixed to the main body of the image pickup apparatus. Consequently, the image pickup unit is held on the main body of the image pickup apparatus, in a moveable manner, by the magnetic force of the holding member. A drive mechanism is provided at the center of a central aperture portion of the annular holding member. The drive mechanism includes a two-dimensional piezoelectric actuator, a frictional member provided at an approximately central portion of the actuator, and the like. The frictional member is configured to abut the convexly spherical surface of the image pickup unit and to move along with the extension and contraction of each arm of the two-dimensional piezoelectric actuator so as to allow the image pickup unit to move in a predetermined manner.

According to the above-described device for changing the angle of a ball joint and image pickup apparatus, the complexity of the gimbal mechanism and joint mechanism can be overcome, and a small-sized, multi-degree-of-freedom drive mechanism can be achieved.

Since a piezoelectric motor of this type is driven by friction, the piezoelectric motor needs to be used in such a manner that the piezoelectric unit is pressed against the driven target. However, the above-described device for changing the angle of a ball joint has a structure in which a preload force is applied by using the plurality of spring members. This structure, in practice, requires a preload part composed of the spring members and, on the periphery of the preload part, a guide part for rotatably supporting the ball member. The preload part and guide part have led to upsizing of the motor, as well as a reduction in the range of movement and an increase in the drive load (an increase in idle torque) due to friction. In addition, since the ball member, oscillators, and plurality of spring members are all disposed inside the ball housing member, the problem has arisen that the device as a whole is further increased in size.

Moreover, in the above-described image pickup apparatus, a guide part for rotatably supporting the image pickup unit is structured in such a manner that the holding member composed of the annular magnet attracts the convexly spherical surface portion of the image pickup unit. Accordingly, the drive load due to the friction at the guide part is considerably increased (a considerable increase in idle torque). For this reason, the drive mechanism needs to generate a driving force sufficient to overcome the drive load due to the friction. As a result, the problem has arisen that the apparatus as a whole is increased in size.

SUMMARY OF THE INVENTION

An object of the present invention is to provide a piezoelectric motor and piezoelectric motor system, which can minimize idle torque, improve range of movement and minimize the device as a whole.

An aspect of the present invention inheres in a piezoelectric motor, including: a plurality of piezoelectric units, respectively in contact with a driven target, disposed separately from each other, and configured to drive the driven target; and a magnet configured to apply a preload force to each of the plurality of piezoelectric units by magnetically attracting the driven target in the absence of direct contact with the driven target.

Another aspect of the present invention inheres in a piezoelectric motor system, including: a piezoelectric motor having: a plurality of piezoelectric units, respectively in contact with a driven target, disposed separately from each other, and configured to drive the driven target; and a magnet configured to apply a preload force to each of the plurality of piezoelectric units by magnetically attracting the driven target in the absence of direct contact with the driven target; a preload setting unit configured to set a value of the preload force to be applied to the piezoelectric motor by the magnet; and an amplifier configured to apply a current value to the magnet corresponding to the value.

DETAILED DESCRIPTION OF THE INVENTION

Figure 1:
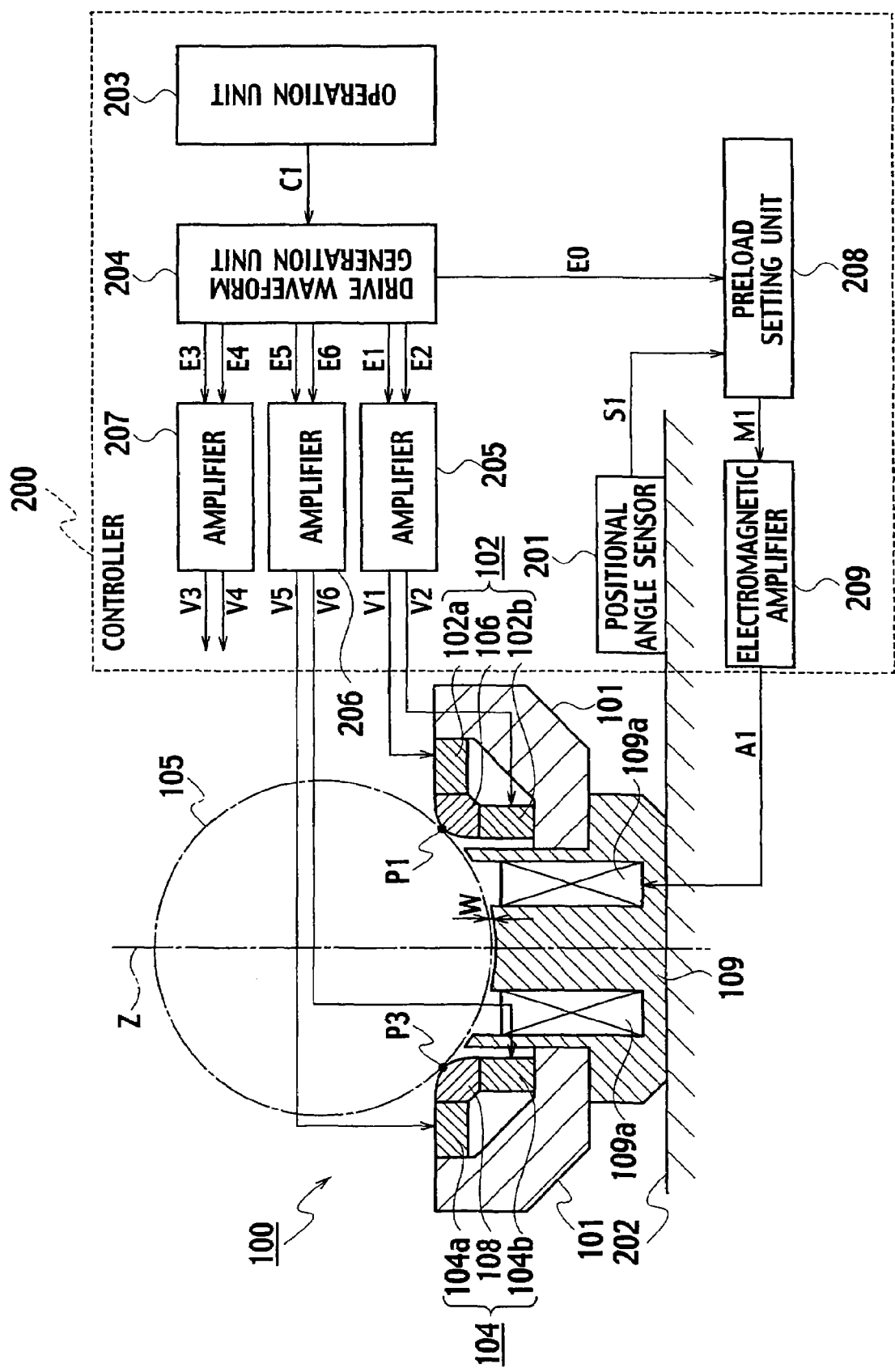
FIG. 1 is a block diagram showing an example of a piezoelectric motor system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of devices, it will be appreciated that the various drawings are not drawn to scale from one figure to another nor inside a given figure, and in particular that the layer thicknesses are arbitrarily drawn for facilitating the reading of the drawings.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Figure 2:
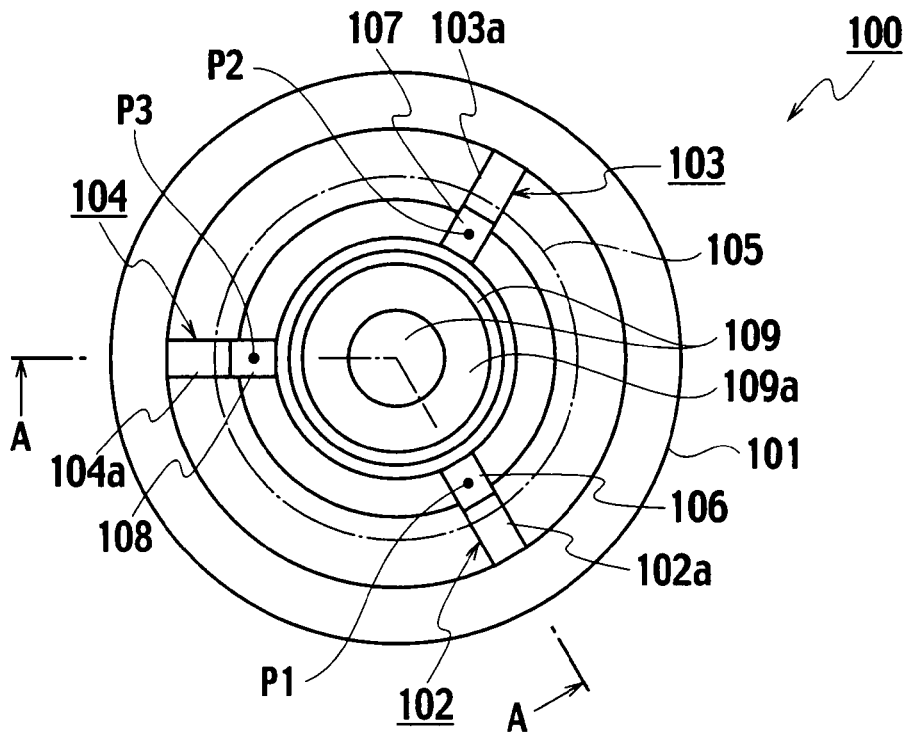
FIG. 2 is a top view showing the piezoelectric motor according to the embodiment of the present invention.

As shown in FIG. 1, a piezoelectric motor system according to an embodiment of the present invention includes a piezoelectric motor 100 that drives a driven target (or a driven object) 105, and a controller 200 that controls the operation of the piezoelectric motor 100. The piezoelectric motor 100, as shown in FIGS. 1 and 2, includes: a base 101 having a substantially annular shape; a plurality of (first to third) piezoelectric units (two-degree-of-freedom piezoelectric units) 102 to 104 that are placed on the base 101 and rotatably support the driven target 105; and a magnet 109 that is placed on the base 101 and applies a preload force to each of the first to third piezoelectric units 102 to 104 by magnetically attracting the driven target 105 in a non-contact state.

The magnet 109 is, for example, in an annular shape and is disposed so as to have a predetermined clearance w from the driven target 105 along a Z axis. The magnet 109 magnetically attracts the driven target 105 in anon-contact state and thereby applies a preload force to the first to third piezoelectric units 102 to 104. For the magnet 109, a single electromagnet, or a combination of a permanent magnet and an electromagnet can be used.

The first to third piezoelectric units 102 to 104 are disposed in a predetermined arrangement required to stably hold the driven target 105. In the example shown in FIG. 2, the piezoelectric units 102 to 104 are equidistantly arranged in the circumferential direction with the Z axis at the center, at an angle of 120 degrees with respect to each other.

The first piezoelectric unit 102 includes: a first piezoelectric element 102a set so that the direction of its oscillation is substantially horizontal relative to the base 101 and also diagonally intersects with a direction in which the driven target 105 is driven. The first piezoelectric unit further includes a second piezoelectric element 102b set so that the direction of its oscillation is substantially vertical relative to the base 101 so as to intersect with the direction of the oscillation of the first piezoelectric element 102a at substantially right angles. Also included in the first piezoelectric unit is a drive part 106 that couples with the first and second piezoelectric elements 102a and 102b, is in contact with the driven target 105 at a contact point P1, and allows the synthesized oscillations of the first and second piezoelectric elements 102a and 102b to transmit a driving force to the driven target 105 by friction.

The second piezoelectric unit 103 includes: a first piezoelectric element 103a set so that the direction of its oscillation is substantially horizontal relative to the base 101 and also diagonally intersects with a direction in which the driven target 105 is driven. The second piezoelectric unit further includes a second piezoelectric element 103b set so that the direction of its oscillation is substantially vertical relative to the base 101 so as to intersect with the direction of the oscillation of the first piezoelectric element 103a at substantially right angles. The second piezoelectric unit also includes a drive part 107 that couples with the first and second piezoelectric elements 103a and 103b, is in contact with the driven target 105 at a contact point P2, and allows the synthesized oscillations of the first and second piezoelectric elements 103a and 103b to transmit a driving force to the driven target 105 by friction.

The third piezoelectric unit 104 includes: a first piezoelectric element 104a set so that the direction of its oscillation is substantially horizontal relative to the base 101 and also diagonally intersects with a direction in which the driven target 105 is driven. The third piezoelectric unit further includes a second piezoelectric element 104b set so that the direction of its oscillation is substantially vertical relative to the base 101 so as to intersect with the direction of the oscillation of the first piezoelectric element 104a at substantially right angles; and a drive part 108 that couples with the first and second piezoelectric elements 104a and 104b, is in contact with the driven target 105 at a contact point P3, and allows the synthesized oscillations of the first and second piezoelectric elements 104a and 104b to transmit a driving force to the driven target 105 by friction.

For each of the first and second piezoelectric elements 102a, 102b, 103a, 103b, 104a, and 104b, anyone of piezoelectric ceramic, electrostrictive ceramic, polymer piezoelectric material, a combination thereof, and a layered stack thereof can be used.

The driven target 105 is, for example, spherical and is supported at the contact points P1 to P3 by the first to third piezoelectric units 102 to 104, whereby the orientation of the driven target 105 is uniquely determined. On the other hand, as for the position of the driven target 105, although the driven target 105 is supported rotatably in geometric terms, the rotational motion thereof is restricted by the frictional force at the contact points P1 to P3 by the first to third piezoelectric units 102 to 104, with the motions of the first to third piezoelectric units 102 to 104 being stopped. The position of the driven target 105 is maintained unless a large external force exceeding the frictional force between the driven target 105 and the first to third piezoelectric units 102 to 104 is exerted.

The controller 200 is an electromagnetic-attraction-force control system for adjusting the preload force applied to the driven target 105 by the first to third piezoelectric units 102 to 104. The controller 200 includes: a positional angle sensor 201 placed on an attachment face 202 of the piezoelectric motor 100; an operation unit 203; a drive waveform generation unit 204 connected to the operation unit 203; amplifiers 205 to 207 each connected to the drive waveform generation unit 204; a preload setting unit 208 connected to each of the positional angle sensor 201 and drive waveform generation unit 204; and an electromagnetic amplifier 209 connected to the preload setting unit 208.

The positional angle sensor 201 measures the position of the piezoelectric motor 100 and transmits position information S1 to the preload setting unit 208. The operation unit 203 sets conditions for driving the piezoelectric motor 100 and transmits an operation signal (order information) C1 to the drive waveform generation unit 204. Based on the operation signal C1 from the operation unit 203, the drive waveform generation unit 204 generates voltage waveforms (driving signals) to be applied to the first and second piezoelectric elements 102a, 102b, 103a, 103b, 104a, and 104b. Based on the driving signals E1 to E6 from the drive waveform generation unit 204, the amplifiers 205 to 207 apply predetermined driving voltages V1 to V6 to the first and second piezoelectric elements 102a, 102b, 103a, 103b, 104a, and 104b, respectively.

The preload setting unit 208 receives as an input the largest value (driving signal) E0 of the applied voltages E1 to E6 from the drive waveform generation unit 204 and the position information S1 from the positional angle sensor 201 and, based on the largest value E0 of the applied voltages and the position information S0, sets a value (preload value) M1 of the preload force by referring to predetermined preload values or by using a predetermined arithmetic expression. Here, the preload setting unit 208 is configured to use both of the largest value E0 of the applied voltages and the position information S1 to set the preload value M1. However, from the viewpoint of a use environment, use state, required precision, and the like, the preload value M1 may be set by using only either one of the largest value E0 of the applied voltages and the position information S1. The electromagnetic amplifier 209 receives as an input the preload value M1 set by the preload setting unit 208 and then, to create a magnetic attraction force corresponding to the preload value M1, is energized to produce an electric current A1 to be applied to a coil 109a of the annular magnet 109.

When an attempt is made to change the position of the driven target 105 by activating the piezoelectric motor 100, the predetermined driving voltages V1 to V6 are respectively applied to the first and second piezoelectric elements 102a, 102b, 103a, 103b, 104a, and 104b of the first to third piezoelectric units 102 to 104 by using the amplifiers 205 to 207. Then, a motion according to a well-known movement, such as, for example, an elliptical motion or a rapid deformation motion, is thus imparted to each of the drive parts 106 to 108 of the first to third piezoelectric units 102 to 104, whereby the drive parts 106 to 108 rotationally drive the driven target 105 in any one of two-degree-of-freedom directions.

As described above, according to the piezoelectric motor system including the piezoelectric motor 100 of the embodiment of the present invention, a configuration is provided such that the driven target 105 is rotatably supported by the first to third piezoelectric units 102 to 104, the driven target 105 is rotationally driven in either one of the two-degree-of-freedom directions depending on a combination of the synthesized oscillations of the first to third piezoelectric units 102 to 104, and a preload force is applied to the first to third piezoelectric units 102 to 104 so that the annular magnet 109 magnetically attracts the driven target 105 with non-contact. Accordingly it is possible to eliminate a frictional contact point other than the contact points P1 to P3 with the first to third piezoelectric units 102 to 104. Hence, theoretically, no drive load is created by the friction with other constituent members. As a result, since the idle torque can be minimized, a large reduction in the size of the first to third piezoelectric units 102 to 104 can be achieved.

Moreover, a configuration is provided such that the first to third piezoelectric units 102 to 104 and magnet 109 are collectively disposed under (in the vicinity of a hemispherical portion on one side) of the driven target 105, and the magnet 109 is disposed within a polyangular (triangular) area formed by straightly connect with each of the positions of the first to third piezoelectric units 102 to 104 line. Accordingly, it is possible to achieve a reduction in the size of the device as a whole, as well as a large increase in the movable range. Taking advantage of such characteristics (the small size and the capability of multi-degree-of-freedom drive), a use for the orientation control of a surveillance camera or the like and a use for a joint of a robot can be expected.

Furthermore, the first to third piezoelectric units 102 to 104 have a large oscillation displacement but have a small developmental force in comparison with a ring-type oscillator with piezoelectric elements attached thereto in a ring. With a small developmental force, a large preload force cannot be generated. Accordingly the proportion of a displacement caused by a change in the position of the piezoelectric motor 100 or the like is large relative to a displacement due to an initial preload force. Since the piezoelectric motor 100 provides a friction drive, there are some cases where the stability of the drive characteristics is impaired when the proportion of a displacement due to a large preload force. In this embodiment of the present invention, a configuration is provided such that the attraction force of the electromagnet 109 is controlled depending on the position of the piezoelectric motor 100 and the maximum voltage to be applied to the piezoelectric units, and the preload force (the magnetic attraction force of the electromagnet 109) is actively adjusted depending on the position of the piezoelectric motor 100 and a change in the drive state of the piezoelectric units 102 to 104. Accordingly, it is possible to enhance the stability of the drive characteristics, even under circumstances where a change has occurred in the position of the piezoelectric motor 100 or in the drive state of the first to third piezoelectric units 102 to 104.

(First Modification)

Figure 3:
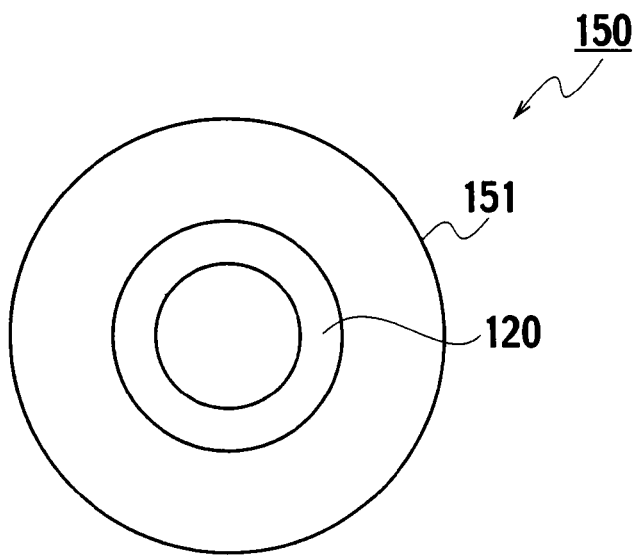
FIG. 3 is a schematic view showing a construction of a variable-sight-line camera module according to the embodiment of the present invention.
Figure 4:
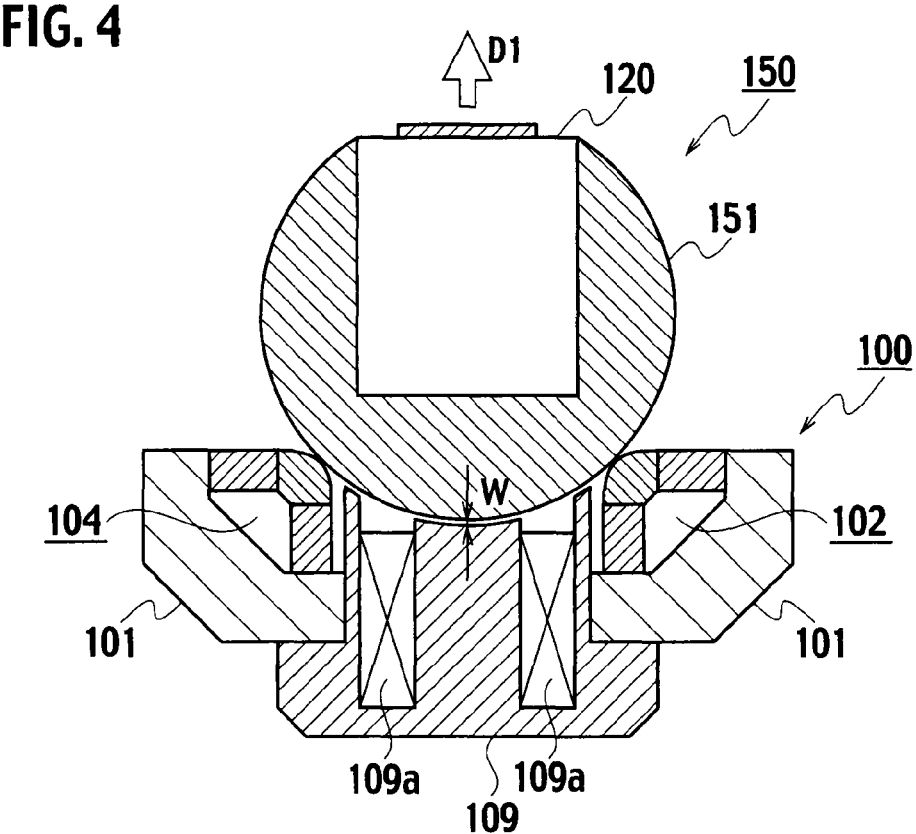
FIG. 4 is a cross-sectional view showing a construction of a variable-sight-line camera module according to the embodiment of the present invention.

A description will be given of the structure of a variable-sight-line camera module including the piezoelectric motor 100 as a mount for such a camera module, as a first modification of the present invention. Referring to FIGS. 3 and 4, a variable-sight-line camera module 150 includes the piezoelectric motor 100, a driven target 151, and a camera module 120 embedded in the vicinity of a central potion on the inner side of the driven target 151.

The camera module 120 is fixedly disposed inside the driven target 151. The driven target 151 has a circumferential surface that provides a spherical shape, to which a driving force from the first to third piezoelectric units 102 to 104 is transmitted. Note that the variable-sight-line camera module 150 includes image processing means for performing rotation of a shot image, if necessary.

Figure 5:
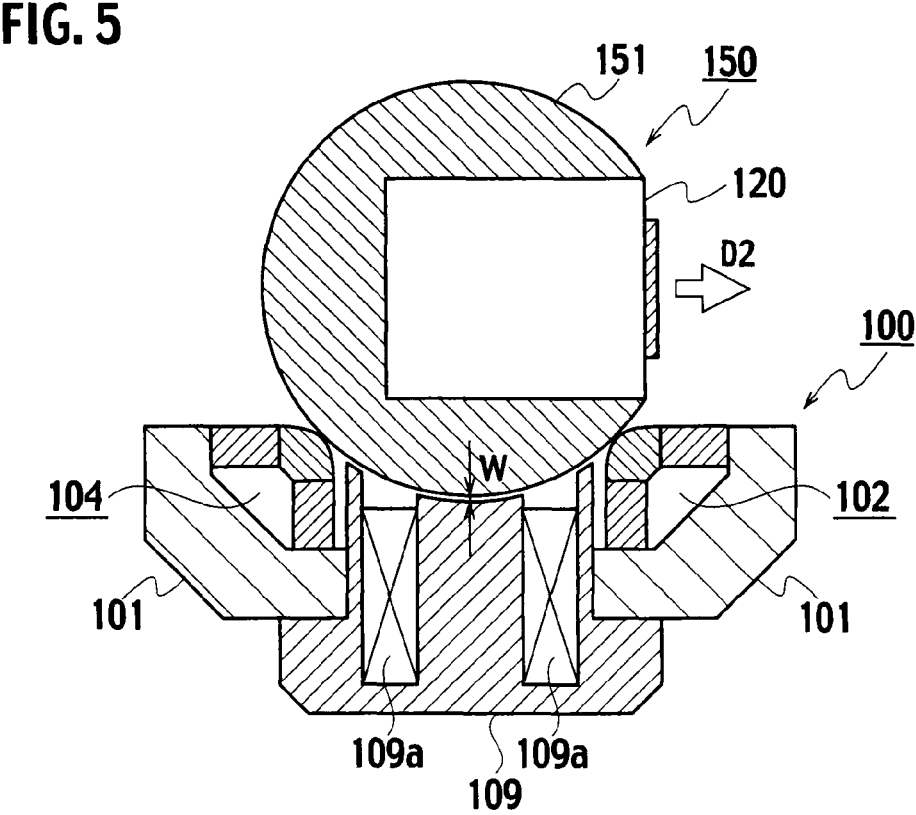
FIG. 5 is a cross-sectional view for explaining an operation for changing sight line of a variable-sight-line camera module according to the embodiment of the present invention.
Figure 6:
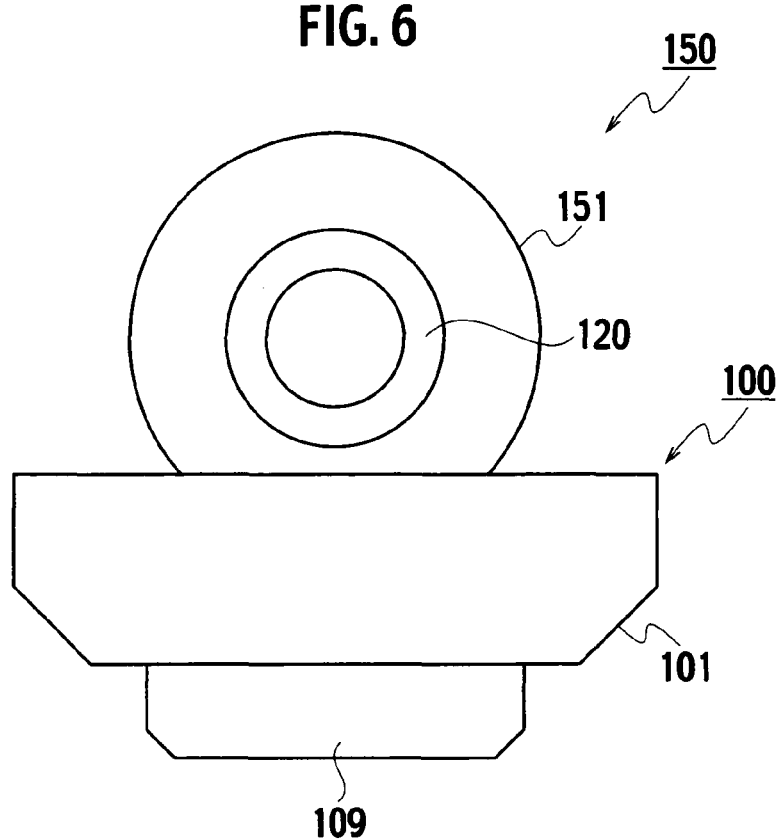
FIG. 6 is a schematic view for explaining an operation for changing sight line of a variable-sight-line camera module according to the embodiment of the present invention.

When the driven target 151 is rotationally driven by activating the piezoelectric motor 100, the direction of the sight line of the camera module 120 can be changed to any one of two-degree-of-freedom directions. For example, a direction D1 of the sight line of the camera module 120, directed vertically (upward) in FIG. 4, can be changed to a direction D2 of the sight line, directed horizontally (sideways) as shown in FIGS. 5 and 6.

Additionally, a description is only given of that which is different from the piezoelectric motor 100 shown in FIGS. 1 and 2, and an overlapping description of the common parts will be omitted.

The variable-sight-line camera module 150 according to the first modification of the embodiment of the present invention has a structure in which the first to third piezoelectric units 102 to 104 and annular magnet 109 are collectively disposed under (in the vicinity of a hemispherical portion on one side of) the driven target 151 mounted by the camera module 120. Accordingly, the variable-sight-line camera module 150 can shoot 360-degree (omnidirectional) images of the surroundings, while achieving a reduction in the size of the device as a whole.

(Second Modification)

Figure 7:
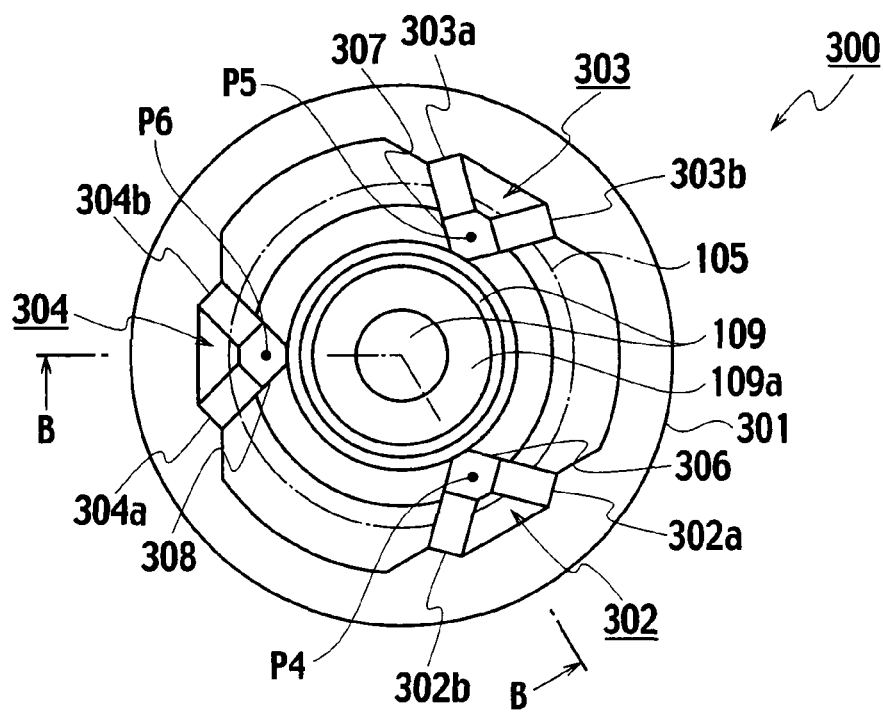
FIG. 7 is a top view showing a construction of a piezoelectric motor according to a modification of the embodiment of the present invention.
Figure 8:
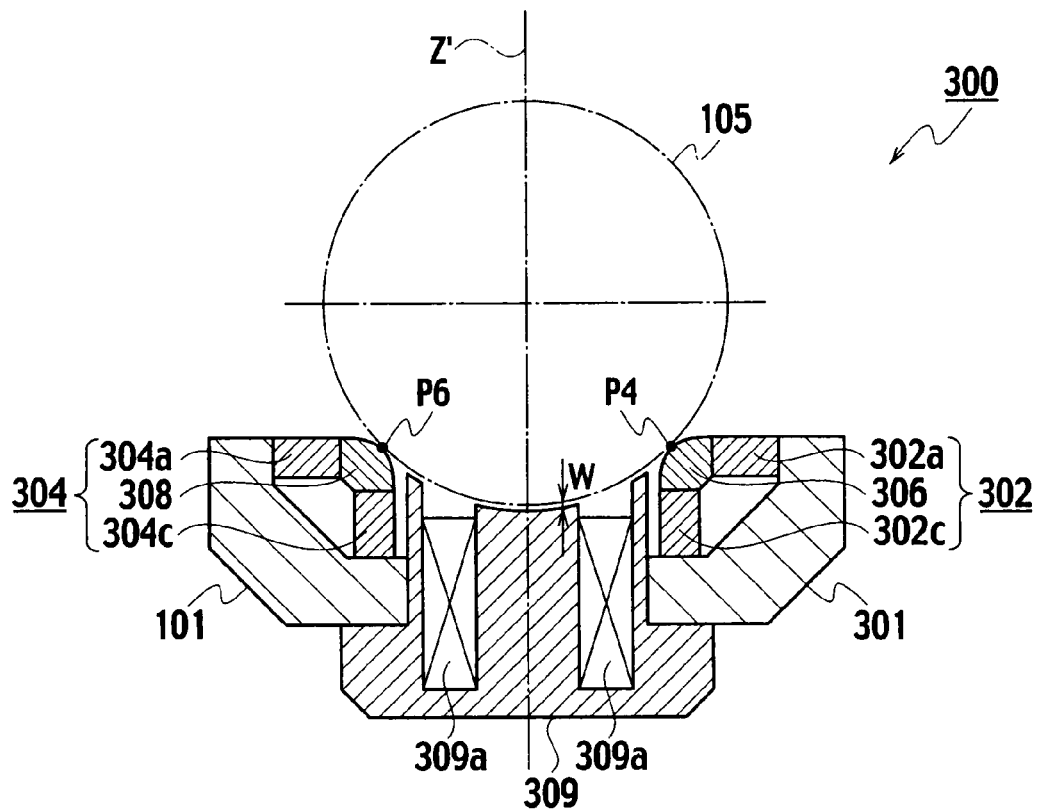
FIG. 8 is a cross-sectional view of B-B line of FIG. 7 showing the piezoelectric motor according to the modification of the embodiment of the present invention.

Referring to FIGS. 7 and 8, a piezoelectric motor 300 according to a second modification of the embodiment of the present invention includes: a driven target 105; a base 301 in a substantially annular shape; first to third piezoelectric units (three-degree-of-freedom piezoelectric units) 302 to 304 that are placed on the base 301 and are equidistantly disposed in the circumferential direction with a Z' axis at the center, at an angle of 120 degrees with respect to each other; and an annular magnet 109 disposed so as to have a predetermined clearance w from the driven target 105 along the Z' axis.

The annular magnet 109 applies a preload force to the first to third piezoelectric units 302 to 304 by magnetically attracting the driven target 105 without direct physical contact therewith.

In the first piezoelectric unit 302, first to third piezoelectric elements 302a to 302c are disposed so that their neutral axes intersect with each other at substantially right angles so as to intersect at a point. Here, "neutral axis" is defined as an axis in the cross section of each of the first to third piezoelectric elements 302a to 302c, in which there are no longitudinal stresses of strains. The first and second piezoelectric elements 302a and 302b are set so that the directions of their oscillations are substantially horizontal relative to the base 301. The third piezoelectric element 302c is set so that the direction of its oscillation is substantially vertical relative to the base 301. A drive part 306 couples with the first to third piezoelectric elements 302a to 302c so as to permit their synthesized oscillations to transmit a driving force to the driven target 105 by frictional contact at a contact point P4.

In the second piezoelectric unit 303, first to third piezoelectric elements 303a to 303c (not shown) are disposed so that their neutral axes intersect with each other at substantially right angles. The first and second piezoelectric elements 303a and 303b are set so that the directions of their oscillations are substantially horizontal relative to the base 301. The third piezoelectric element 303c (not shown) is set so that the direction of its oscillation is substantially vertical relative to the base 301. A drive part 307 couples with the first piezoelectric element 303a, second piezoelectric element 303b, and third piezoelectric element 303C (not shown) and allows their synthesized oscillations to transmit a driving force to the driven target 105 by frictional contact at a contact point P5.

In the third piezoelectric unit 304, first to third piezoelectric elements 304a to 304c are disposed so that their neutral axes intersect with each other at substantially right angles. The first and second piezoelectric elements 304a and 304b are set so that the directions of their oscillations are substantially horizontal relative to the base 301. The third piezoelectric element 304c is set so that the direction of its oscillation is substantially vertical relative to the base 301. A drive part 308 couples with the first to third piezoelectric elements 304a to 304c and allows their synthesized oscillations to transmit a driving force to the driven target 105 by friction contact at a contact point P6.

The driven target 105 is supported at the contact points P4 to P6 by the first to third piezoelectric units 302 to 304, whereby the orientation of the driven target 105 is uniquely determined. On the other hand, as to the position of the driven target 105, although the driven target 105 is rotatably supported in geometric terms, the rotational motion thereof is restricted by the frictional force at the contact points P4 to P6 by the first to third piezoelectric units 302 to 304, with the movements of the first to third piezoelectric units 302 to 304 being restricted. The position of the driven target 105 is maintained unless a large external force exceeding the frictional force between the driven target 105 and the first to third piezoelectric units 302 to 304 is applied.

When there is an attempt to change the position of the driven target 105 by activating the piezoelectric motor 300, predetermined driving voltages are applied to the first to third piezoelectric elements 302a to 302c, 303a to 303c, and 304a to 304c of the first to third piezoelectric units 302 to 304 by using amplifiers (not shown), and a well-known motion (movement), such as, for example, an elliptical motion or a rapid deformation motion, is imparted to each of the drive parts 306 to 308 of the first to third piezoelectric units 302 to 304, whereby the position of the driven target 105 is rotationally driven in any one of the three-degree-of-freedom directions.

As described above, according to the piezoelectric motor 300 of the second modification of the embodiment of the present invention, a configuration is provided such that the driven target 105 is rotatably supported by three (first to third) piezoelectric units 302 to 304. Also, in the configuration, the driven target 105 is rotationally driven in any one of the three-degree-of-freedom directions depending on a combination of the synthesized oscillations of the first to third piezoelectric units 302 to 304. The configuration also permits a preload force to be applied to the first to third piezoelectric units 302 to 304 in such a manner that the annular magnet 309 magnetically attracts the driven target 105 without directly contacting the driven target 105. Accordingly, it is possible to eliminate a frictional contact point other than the contact points P4 to P6 with the first to third piezoelectric units 302 to 304, and hence, theoretically, no drive load is created by frictional contact at other constituent members. As a result, since the idle torque can be minimized, a large reduction in the size of the first to third piezoelectric units 302 to 304 can be achieved.

Note that although the variable-sight-line camera module 150 according to the first modification is configured to use the piezoelectric motor 100 based on the two-degree-of-freedom piezoelectric units, the variable-sight-line camera module 150 can be configured to use the piezoelectric motor 300 based on the three-degree-of-freedom piezoelectric units according to the second modification. In the variable-sight-line camera module 150, the image processing means for performing rotation of an image is assumed to be used if necessary. However, if the variable-sight-line camera module is configured to use the piezoelectric motor 300, the rectification of an image, which cannot be achieved with the piezoelectric motor 100, can be achieved by taking advantage of the characteristics of the three-degree-of-freedom rotary drive, and the image processing means is no longer needed. Further, since image processing is not needed, images shot by the camera can be 360-degree (omnidirectional) images of the surroundings having high real-time quality and stability.

Other Embodiment

Various modifications will become possible for those skilled in the art after receiving the teachings of the present disclosure without departing from the scope thereof.

For example, although a description has been given of the combination of three two-degree-of-freedom piezoelectric units or three-degree-of-freedom piezoelectric units, the number of piezoelectric units to be combined is not particularly limited. For example, four or more piezoelectric units may be combined as shown in FIG. 9, in which four two-degree-of-freedom piezoelectric units 402 to 405 are combined.

Figure 9:
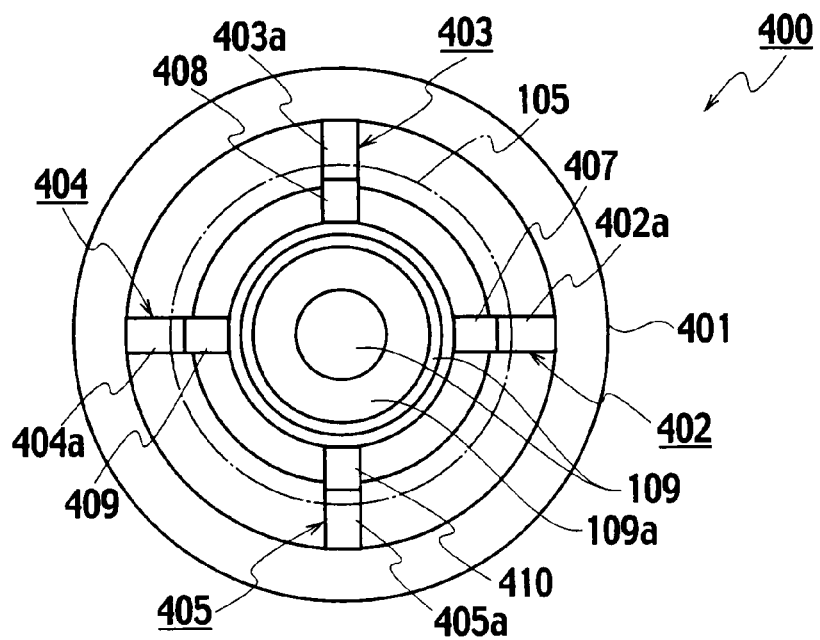
FIG. 9 is a top view showing a construction of the piezoelectric motor according to the modification of the embodiment of the present invention.

As shown in FIG. 9, element 401 indicates a base, similarly as base 101 in FIG. 2. Further, elements 407, 408, 409, and 410 indicate drive parts, respectively, similar to drive parts 106, 107, and 108 in FIG. 2. Further, elements 402a, 403a, 404a, and 405a indicate piezoelectric elements, respectively, similar to piezoelectric elements 102a, 103a, and 104a in FIG. 2.

Moreover, for the driven target 105, the described example is that a ball is rotated as shown in FIG. 1. However, this example is not restrictive. For example, a flat plate may be used as the driven target 105 and may be moved linearly.

Further, in place of the magnet 109 shown in FIG. 1, a plurality of magnets may be disposed respectively in the vicinities of the places where the piezoelectric units 102 to 104 are disposed.

Furthermore, although the magnet 109 and piezoelectric units 102 to 104 are disposed under the driven target 105, they may be disposed above the driven target, depending on the installation environment.

What is claimed is:

1. A piezoelectric motor, comprising:
a plurality of piezoelectric units, respectively in contact with a driven target, disposed separately from each other, and configured to drive the driven target; and
a magnet configured to apply a preload force to each of the plurality of piezoelectric units by magnetically attracting the driven target in the absence of direct contact with the driven target,
wherein the piezoelectric units drive the driven target in two-degree-of-freedom directions,
wherein each of the plurality of piezoelectric units comprises:
first and second piezoelectric elements having oscillation directions diagonally intersecting with a driving direction of the driven target, respectively; and
a drive part contacting the driven target, coupling with the first and second piezoelectric elements, and driving the driven target in a plane perpendicular to a driving plane of the driven target by synthesized oscillations of the first and second piezoelectric elements.

2. A piezoelectric motor, comprising:
a plurality of piezoelectric units, respectively in contact with a driven target, disposed separately from each other, and configured to drive the driven target; and
a magnet configured to apply a preload force to each of the plurality of piezoelectric units by magnetically attracting the driven target in the absence of direct contact with the driven target,
wherein the piezoelectric units drive the driven target in three-degree-of-freedom directions, and
wherein each of the piezoelectric units comprises:
first to third piezoelectric elements having axes that have an intersection point intersecting with each other; and
a drive part in contact with the driven target so as to couple with the first to third piezoelectric elements, and driving the driven target by synthesized oscillations of the first to third piezoelectric elements.

3. The piezoelectric motor of claim 1, wherein the magnet is disposed within a polyangular area that is formed by connecting each of locations of the plurality of piezoelectric units by a straight line.

4. The piezoelectric motor of claim 1, wherein the magnet is provided as a plurality of magnets.

5. The piezoelectric motor of claim 4, wherein the plurality of magnets is disposed in the vicinity of a position of each of the piezoelectric units.

6. A piezoelectric motor system, comprising:
a piezoelectric motor comprising:
a plurality of piezoelectric units, respectively in contact with a driven target, disposed separately from each other, and configured to drive the driven target;
wherein each of the plurality of piezoelectric units comprises:
first and second piezoelectric elements having oscillation directions diagonally intersecting with a driving direction of the drive target, respectively;
a magnet configured to apply a preload force to each of the plurality of piezoelectric units by magnetically attracting the driven target in the absence of direct contact with the driven target;
a preload setting unit configured to set a value of the preload force to be applied to the piezoelectric motor by the magnet based on at least position information of the piezoelectric motor and order information for the piezoelectric unit; and
an amplifier configured to apply a current value to the magnet corresponding to the value.

7. The system of claim 6, further comprising a positional angle sensor configured to measure a positional angle of the piezoelectric motor as the position information and to transmit the position information to the preload setting unit.

8. The system of claim 6, further comprising a camera module embedded inside the driven target.

9. The system of claim 6, wherein the piezoelectric units drive the driven target in two-degree-of-freedom directions.

10. The system of claim 6, wherein each of the plurality of piezoelectric units comprises:
    first and second piezoelectric elements having oscillation directions intersecting with each other; and
    a drive part contacting the driven target, coupling with the first and second piezoelectric elements, and driving the driven target by synthesized oscillations of the first and second piezoelectric elements.

11. The system of claim 6, wherein the piezoelectric units drive the driven target in three-degree-of-freedom directions.

12. The system of claim 6, wherein each of the piezoelectric units comprises:
    first to third piezoelectric elements having axes that have an intersection point intersecting with each other; and
    a drive part in contact with the driven target so as to couple with the first to third piezoelectric elements, and driving the driven target by synthesized oscillations of the first to third piezoelectric element.

13. The system of claim 6, wherein the magnet is disposed within a polyangular area that is formed by connecting each of locations of the plurality of piezoelectric units by a straight line.

14. The system of claim 6, wherein the magnet is provided as a plurality of magnets.

15. The piezoelectric motor of claim 14, wherein the plurality of magnets is disposed in the vicinity of a position of each of the piezoelectric units.

* * * * *